United States Patent [19]

Nakao et al.

[11] Patent Number: 4,575,896
[45] Date of Patent: Mar. 18, 1986

[54] CASTER WITH AN OSCILLATION STOPPING MECHANISM

[75] Inventors: Shinroku Nakao, Kanagawa; Kunimasa Tsuchiya, Tokyo, both of Japan

[73] Assignee: Combi Co., Ltd., Tokyo, Japan

[21] Appl. No.: 480,645

[22] Filed: Mar. 31, 1983

[30] Foreign Application Priority Data

Dec. 25, 1980 [JP] Japan .................. 55-187072

[51] Int. Cl.⁴ ............................................. B60B 33/00
[52] U.S. Cl. ........................................ 16/35 R; 16/44
[58] Field of Search .......... 16/35 R, 44, 37, DIG. 36; 267/153

[56] References Cited

U.S. PATENT DOCUMENTS 1,731,312 10/1929 Matheson ..................... 16/35 R
4,035,864 7/1977 Schroder ..................... 16/35 R

FOREIGN PATENT DOCUMENTS 2833330 2/1980 Fed. Rep. of Germany .......... 16/44
53-18759 2/1978 Japan .

Primary Examiner—Douglas D. Watts
Attorney, Agent, or Firm—Sughrue, Mion, Zinn, Macpeak, and Seas

[57] ABSTRACT

A caster is provided with a lock clip, which, when operable, joins the caster and a caster holder to prevent oscillatory movement therebetween. A first axle joins the caster body and the caster holder, the axle including a base frame at the bottom thereof which is receivable within the caster body. A rubber damper between the caster body and the base frame provides a shock absorbing effect between these two elements.

2 Claims, 4 Drawing Figures

CASTER WITH AN OSCILLATION STOPPING MECHANISM

BACKGROUND OF THE INVENTION

The present invention relates to a caster, and especially to a caster provided with an oscillation preventing mechanism for restricting the oscillatory motion of a caster wheel.

The object of the present invention is to provide a caster capable of preventing the oscillating and turning motion of a caster body, which permits the free rotation of the caster wheel per se with a shock-absorbing effect, even while the oscillating and turning mortion is prevented.

It is well known to use casters in making an object or goods movable.

There are many known conventional casters, from one merely providing a wheel on a caster body to one in which a wheel portion can be freely oscillated with respect to the caster body. Further, as shown in Japanese Patent Application (Kokai) No. 53-18759, there has been proposed an improved caster in which a stopping mechanism is provided for stopping oscillating motion due to an oscillating mechanism. However, such conventional casters merely show a most basic construction whereby the oscillating motion can be stopped and released, and do not achieve increased utility by adding a shock-absorbing function.

SUMMARY OF THE INVENTION

An object of the present invention is to eliminate the above-mentioned drawbacks of conventional casters and to provide an improved caster having a high utility.

BRIEF DESCRIPTION OF THE DRAWINGS

An embodiment of the present invention will be explained hereinafter with reference to the following drawings; in which.

DETAILED DESCRIPTION OF THE PREFERRED EMBODIMENTS

Figure 1:
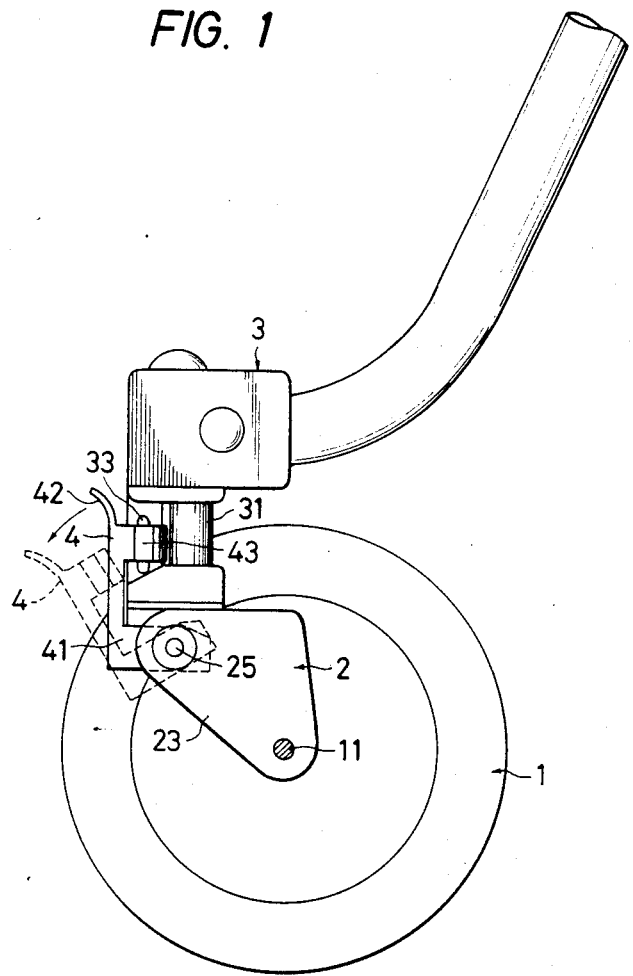
FIG. 1 shows an embodiment of the caster of the present invention.
Figure 2:
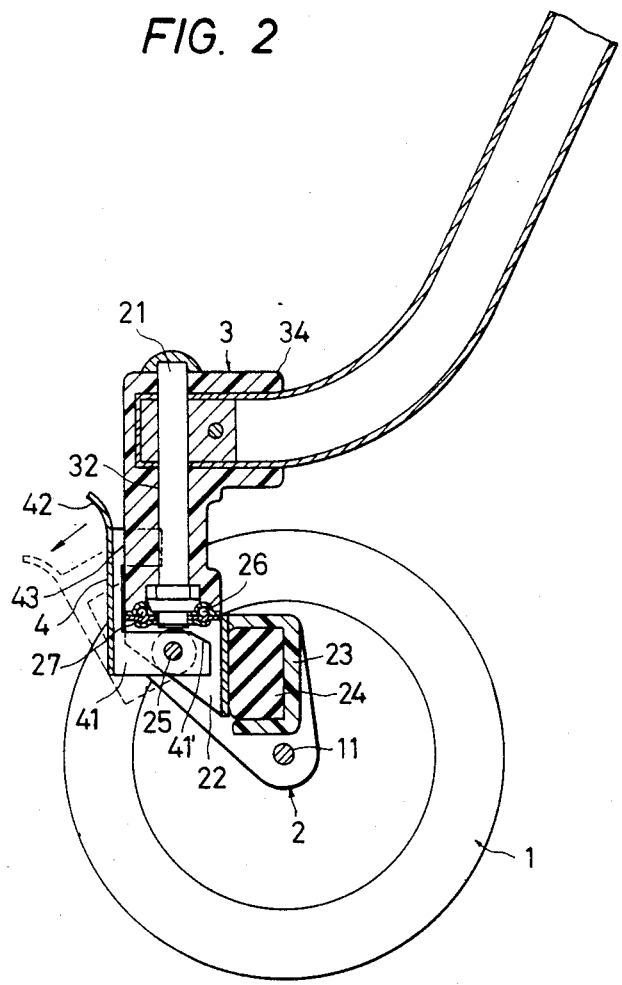
FIG. 2 is a partially sectional view of the caster of FIG. 1.
Figure 3:
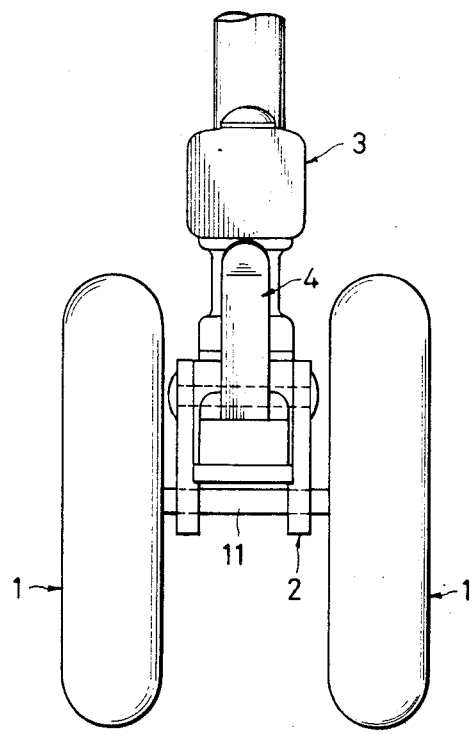
FIG. 3 is a front view of the caster.
Figure 4:
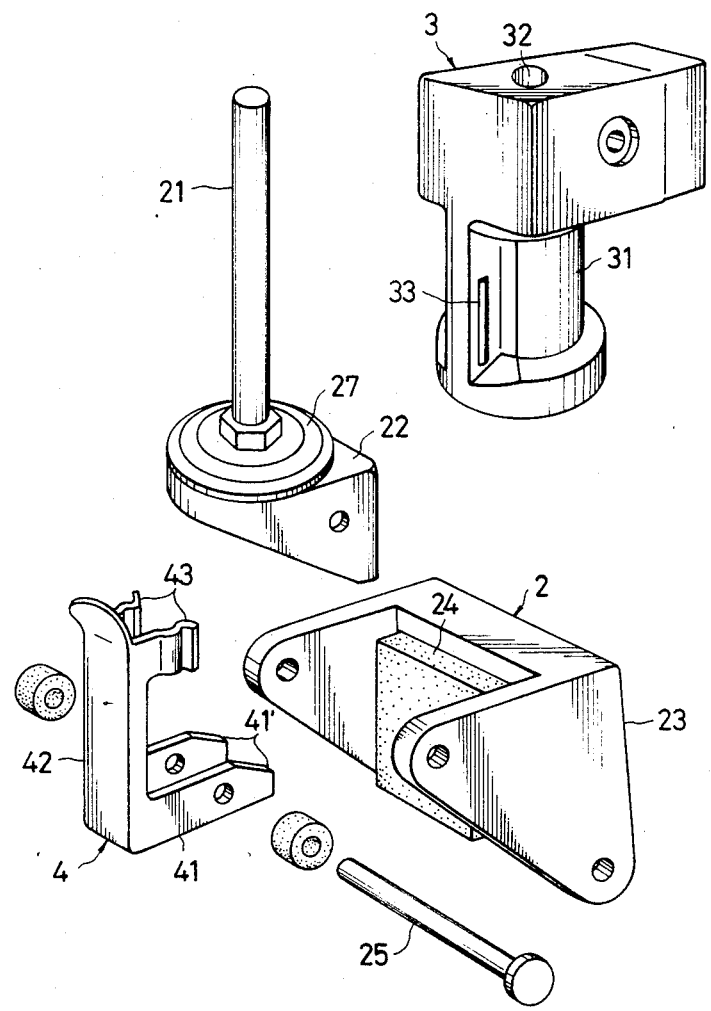
FIG. 4 is an exploded perspective view of the caster of the present invention.

The caster of the present invention is composed of a caster body 2 supporting a wheel 1, a caster holder 3 and a lock clip 4. The caster body 2 is composed of a base frame 22 having a rotational axle 21 and an oscillating frame 23 mounted with a rubber damper 24. The base frame 22 is connected to the oscillating frame 23 via an axle 25 so as to be freely movable. A supporting axle 11 for the wheel 1 is mounted at the lower portion of the oscillating frame 23. To effect a smooth rotation of the rotational axle 21, it is preferable to provide a ball bearing mechanism composed of a plurality of balls 26 disposed between the upper surface of the base frame 22 and the lower surface of the rotational axle 21, and a disk plate 27. The caster holder 3 is made of synthetic resin or the like, and has a configuration sucn that a through hole 32 is provided in the base rod 31 and such that a recess portion 33 for receiving the lock clip is formed on the peripheral surface of the base rod 31 along the longitudinal direction thereof. Numeral 34 designates an insertion hole formed on the top surface of the base rod 31 for receiving a supporting leg, but this means may be replaced by a dish-like fixing member (not shown) as usually used in a conventional caster. The lock clip 4 has a configuration such that a pair of pinching plates 43 are mounted at the upper portion of a back plate 42, and a pair of base plates 41 are mounted at the lower portion of the back plate 42. The base plates 41 are inserted into the base frame 22, and are rotatably mounted at the end portions thereof to the base frame 22 using the axle 25. The lock clip 4 thus constructed may be made of metallic material. The pinching plates 43 are composed of two resilient arm plates opposed to each other, and the end portions of the pinching plates 43 can pinch the recess portion 33 formed on the base rod 31 of the caster holder 3. The topmost end of the back plate 42 is bent slightly outwardly so as to facilitate movement of the lock clip 4. There are formed inclined sides 41' at the respective end portions of the base plates 41 so as to restrict excessive inclination of the lock clip 4 by contacting the inclined sides 41' to the lower surface of the base frame 22 when the lock operation of the lock clip 4 is released.

According to the present invention thus constructed, where the lock operation of the lock clip 4 is released, the caster body 2 can be freely oscillated and turned around the rotational axle 21 inserted into the caster holder 3, to thereby achieve the same effect as a conventional caster. On the other hand, in the case where the pinching plates 43 of the lock clip 4 are fitted to the recess portion 33 of the caster holder 3, the caster body 2 is fixed to the caster holder 3 as a body, to thereby stop the oscillating and turning motions of the caster body 2 and to effect movement in a constant direction.

Further according to the present invention, since the caster body 2 is composed of a base frame having a rotational axle 21 and an oscillating frame 23 having a damper rubber 24, and since the base frame 22 and the oscillating frame 23 are movably combined by means of the axle 25, a shock-absorbing effect is always applied to the wheel 1, to thereby facilitate the caster to smoothly rotate the rotational axle 21 without any noise being created thereby.

What is claimed is:

1. A caster, comprising; a caster body (2), a caster holder (3), and a first rotational axle (21) extending between said caster body and said caster holder and including a base frame (22) at a lower end thereof; said base frame and said caster body jointly receiving a second rotational axle (25) therethrough; a lock clip rotatably supported by said second rotational axle for selectively locking said caster holder and said base frame, said castor body being rotatably mounted with respect to said second rotational axle, and a rubber damper disposed between said caster body and said base frame, said rubber damper being compressible between a front of said base frame and a rear, vertical face of said caster body.

2. A caster as claimed in claim 1, said first rotational axle being rotatably received in a hole provided within a base rod (31) of said holder, said lock clip having a base plate rotatably mounted on said second rotational axle, and pinching plates for detachably engaging said caster holder for preventing relative swiveling motion about said first rotational axle between said caster holder and said caster body.

* * * * *